United States Patent [19]
Livingston et al.

[11] 3,957,565
[45] May 18, 1976

[54] APPARATUS FOR EXTRUDING PLASTIC NETTING

[75] Inventors: Wayne W. Livingston, Osseo; Gerald W. Melin, Wyoming, both of Minn.

[73] Assignee: Bemis Company, Inc., Minneapolis, Minn.

[22] Filed: Mar. 13, 1974

[21] Appl. No.: 450,859

[52] U.S. Cl. .............................. 156/500; 156/244; 264/167; 425/133.1; 425/382 N; 425/464
[51] Int. Cl.² .......................................... B29B 5/04
[58] Field of Search ............ 156/244, 500; 264/167, 264/173; 425/113, 133.1, 375, 381, 382 N, 461, 463, 464

[56] References Cited
UNITED STATES PATENTS

| | | | |
|---|---|---|---|
| 3,067,084 | 12/1962 | Nalle | 156/500 |
| 3,560,306 | 2/1971 | Nalle | 156/500 |
| 3,616,080 | 10/1971 | Nalle | 156/500 |
| 3,758,359 | 9/1973 | Azuma | 156/500 |

*Primary Examiner*—Caleb Weston
*Attorney, Agent, or Firm*—Koenig, Senniger, Powers and Leavitt

[57] ABSTRACT

Apparatus for and methods of extruding tubular plastic netting from extrusion orifices in concentric, counterrotatable inner and outer dies in which the plastic filaments extruded therefrom have substantially the same downward relative velocity so as to form netting intersections with substantially no relative shear movement between intersecting filaments.

8 Claims, 10 Drawing Figures

APPARATUS FOR EXTRUDING PLASTIC NETTING

BACKGROUND OF THE INVENTION

This invention relates to apparatus for extruding plastic netting or the like.

More particularly, this invention is concerned with apparatus for extruding a plurality of filaments of plastic in such manner as to form a tube of netting in which the filaments overlap or intersect one another and are joined at intersections or "knots". Such extruding apparatus is shown, for example in U.S. Pat. Nos. 2,919,467, 3,607,084, 3,560,306, 3,620,883 and in East German Pat. No. 52,801. Tubular plastic netting is conventionally produced by forcing plastic melt through a series of extrusion orifices in an inner die and through an adjacent circular series of extrusion orifices in an outer die surrounding the inner die, the inner and outer dies being rotatable relative to one another. Upon cooling, the netting is oftentimes heated and stretched to orient the molecular structure of the plastic so as to enhance strength, size and heat-shrink characteristics for subsequent packaging usage.

Heretofore, conventionally extruded netting oftentimes did not have sufficient strength to withstand subsequent stretching operations. Also, in the extrusion of prior netting, the intersections per se were stretched to such an extent as to result in unsatisfactory netting when used in subsequent packaging operations.

SUMMARY OF THE INVENTION

Among the several objects of the invention may be noted the provision of apparatus for extruding plastic netting in which the plastic filaments are extruded in such manner that the intersecting filaments have substantially no movement relative to one another when they are joined to form intersections; the provision of such apparatus which produces plastic netting having uniform mesh size; the provision of such apparatus which insures that during subsequent orientation of the netting, the individual filaments rather than the intersections of the netting are stretched; and the provisions of such apparatus which is economical in use and reliable in operation.

Briefly, apparatus of this invention for extruding plastic netting comprises concentric inner and outer dies, the outer die having a central opening and the inner die having a rotary sealing fit in this opening. The inner die is rotatable in one direction and the outer die is rotatable in the opposite direction on a common die axis. Each die has a circular series of extrusion passages for extrusion of filaments of plastic therethrough from one side of the die constituting its inside to the other side constituting its outside, the extrusion passages in the iner die being angled in the direction away from the die axis and the extrusion passages on the outer die being angled in the direction toward the die axis. The extrusion passages in the inner die are inclined in one direction with respect to a plane perpendicular to the die axis and the extrusion passages in the outer die are angled in the opposite direction with respect to said plane so that one end of each passage in each die leads and the other trails as the die rotates.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
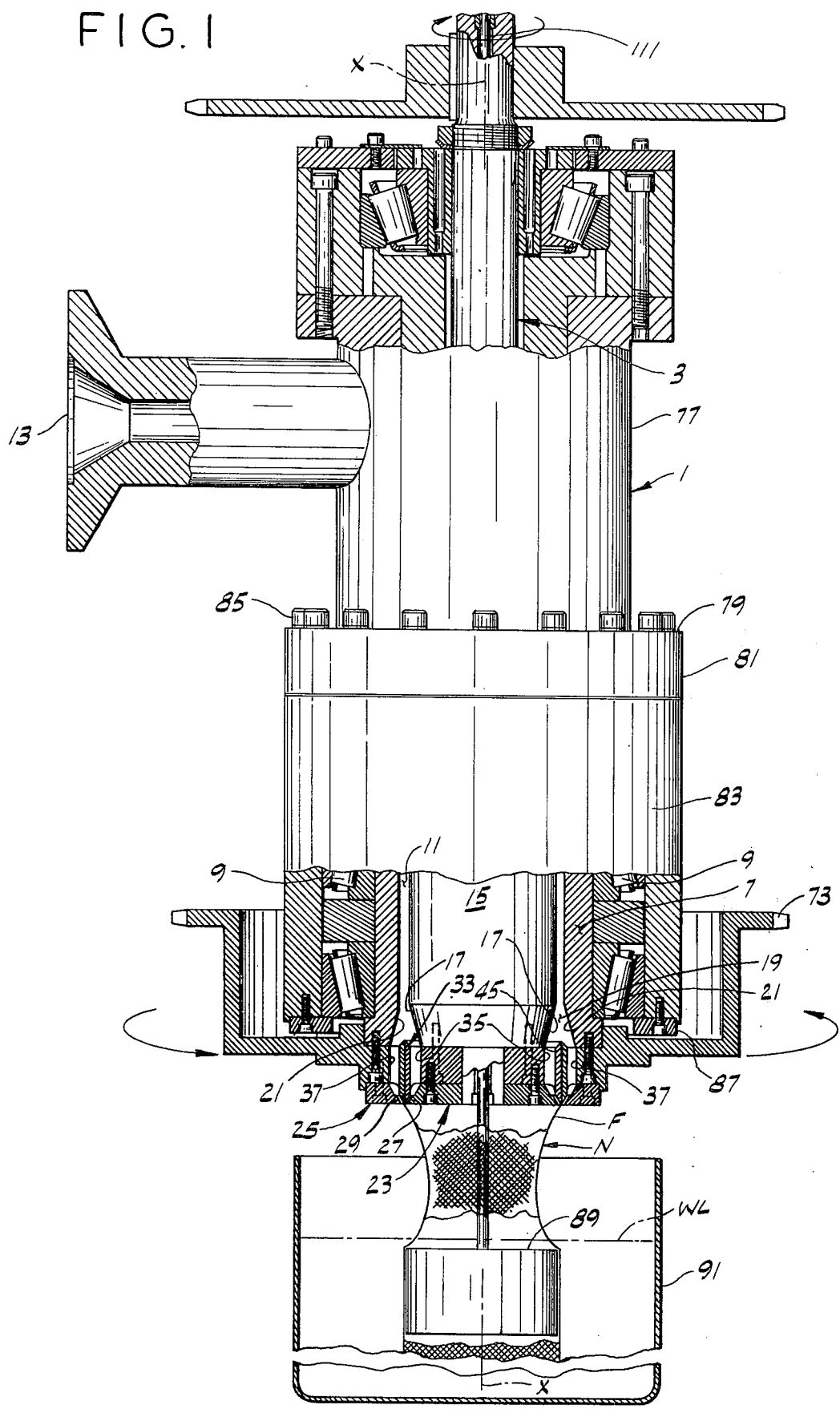
FIG. 1 is a side elevation of extrusion apparatus embodying this invention with parts broken away, illustrating a tube of plastic netting as it extends downwardly after having been extruded.

Referring to the drawings, apparatus of this invention for extruding plastic netting N is shown to comprise a generally vertical extrusion housing 1. A shaft 3 extends through housing 1 from the upper end of the housing and is mounted as by means of suitable bearings for rotation in one direction, as indicated by the arrow in FIG. 1, on a generally vertical axis within the housing. A barrel 7 is mounted as by means of roller thrust bearings 9 for rotation in the lower end of the housing in the opposite direction, as indicated by the second arrow in FIG. 1, on the vertical axis of the housing and the shaft. The shaft is of smaller diameter than the internal diameter of the extrusion housing so that there is an annular space 11 around the shaft between the shaft and the barrel for the downward flow of plastic heated to extrusion temperature and supplied to the housing via an inlet 13. The shaft has an enlarged-diameter cylindrical lower end head 15 with a frustoconical inwardly tapered lower end 17. The barrel surrounds the lower end head of the shaft with a second annular space 19 therebetween connected to the first annular space 11 for the downward passage of the molten plastic to be extruded. The barrel is formed with an internal frustoconical surface 21 at its lower end surrounding the tapered lower end of head 15 and flaring or tapering outwardly opposite the taper 17.

At the lower end of shaft 3 is an inner extrusion die 23 and at the lower end of barrel 7 is an outer die 25 having a central opening and surrounding the inner die, the dies being counterrotatable in opposite directions relative to one another on a common die axis X—X.

The inner die has a circular series of extrusion orifices 27 for extrusion of filaments $F_I$ of plastic therethrough and out from the bottom of the inner die, and the outer die has a circular series of extrusion passages 29 for the extrusion of filaments $F_0$ of plastic therethrough and out the bottom of the outer die. The extrusion orifices extend through dies 23 and 25 from the insides thereof in communication with annular space 19 to the outside of the dies. As appears in FIGS. 3 and 4, the inner and outer die orifices are inclined at an angle with respect to die axes X—X, as will appear, so that they meet on the surface of an imaginary cylinder 31 (shown in phantom at 31 in FIG. 2) for coalescence of filaments $F_I$ and $F_0$ extruded via passages 27 and 29.

Figure 3:
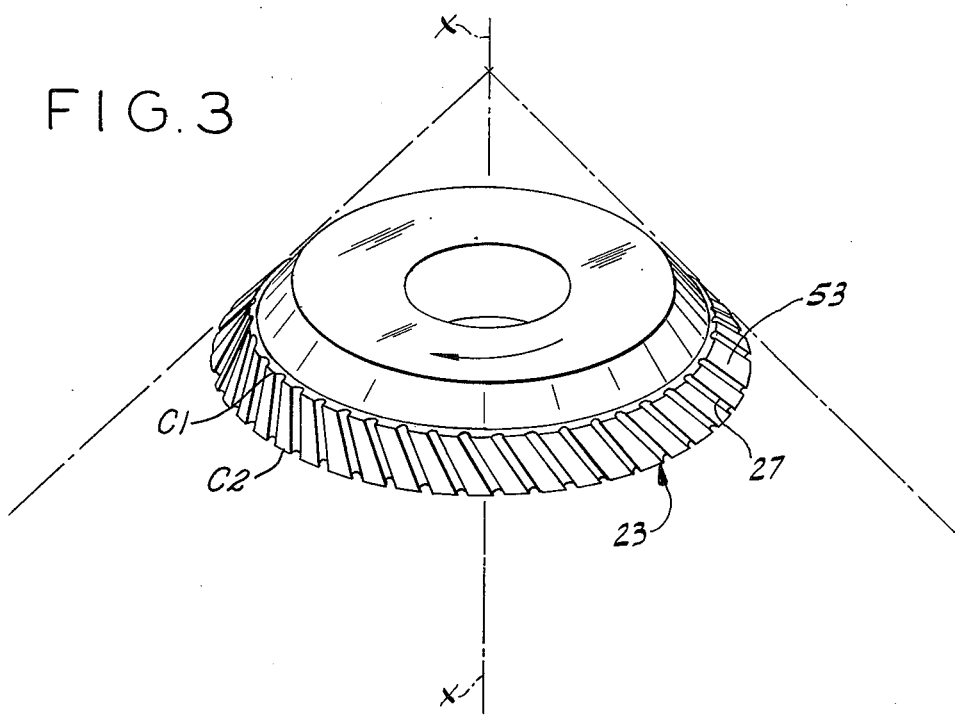
FIG. 3 is a perspective of a lower member of the inner die.
Figure 4:
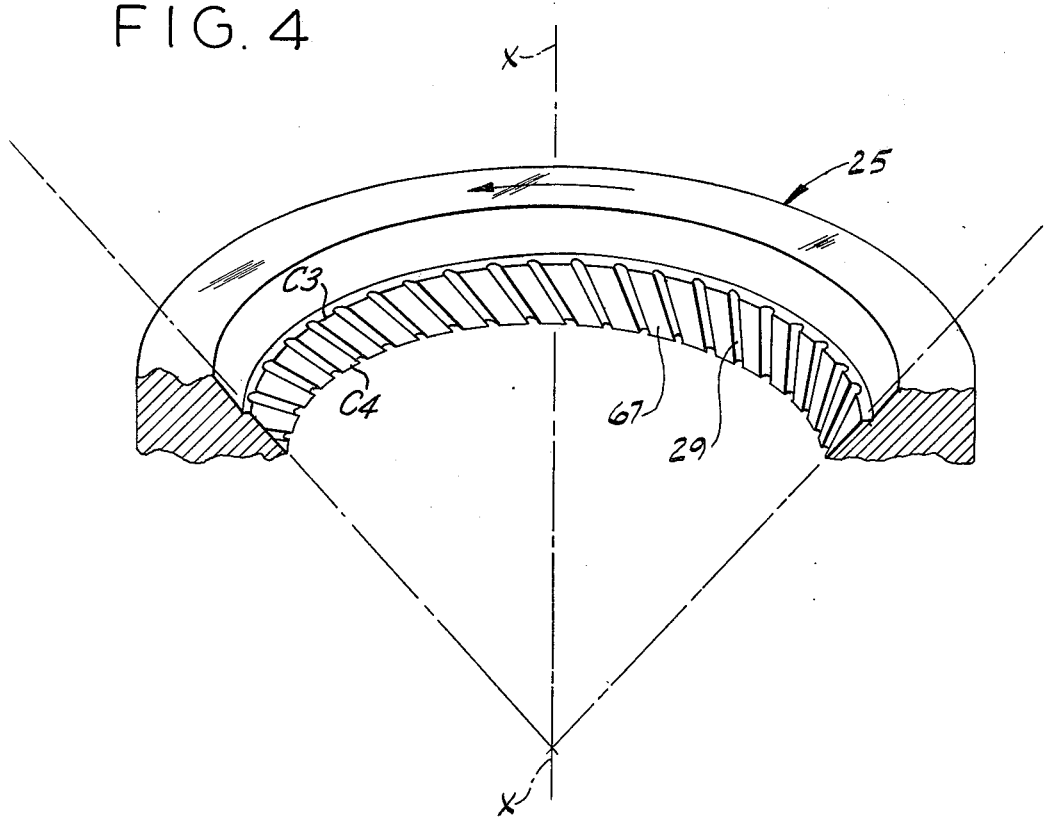
FIG. 4 is a perspective of a lower ring of the outer die.

As shown in FIG. 3, the extrusion orifices or passages of inner die 23 are inclined in one direction with respect to a plane perpendicular to the die axis X—X (i.e., with respect to the top or bottom face of the die), and as shown in FIG. 4, the extrusion orifices 29 of outer die 25 are inclined in the opposite direction with respect to the above-mentioned plane so that one end of each passage leads and the other trails as its respective die rotates. In both inner and outer dies, the leading ends of their orifices are shown to be their inner ends and their trailing ends are shown to be their outer ends.

Figure 2:
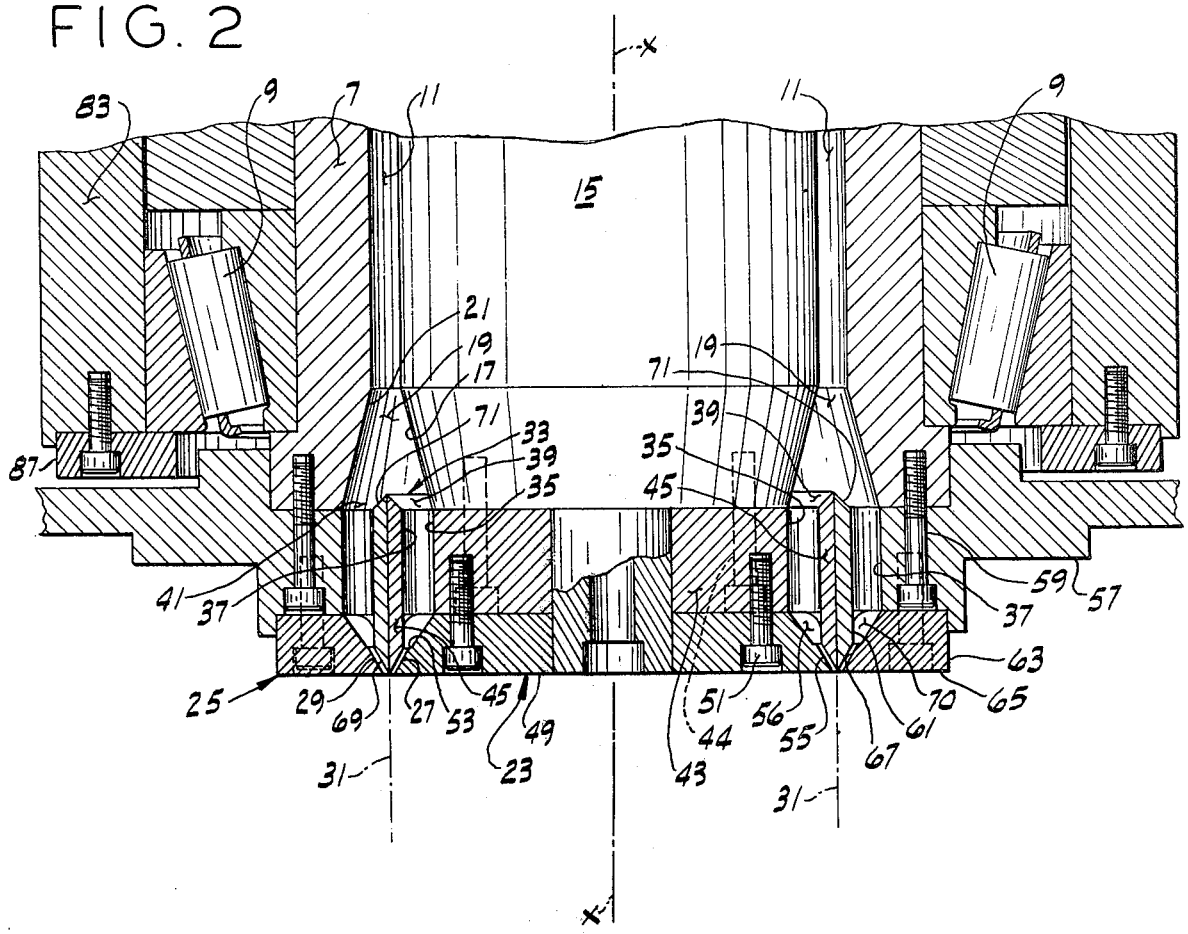
FIG. 2 is an enlargement of a portion of FIG. 1 showing inner and outer dies at the lower end of the extrusion apparatus.

Means, indicated generally at 33, is provided for splitting the downward flow of plastic into two separate streams, one for the extruding orifices 27 of the inner die and the other for the extrusion orifices 29 of the outer die. As will appear, this splitting means is formed substantially to equalize the rate of flow of the plastic to the extrusion orifices. The inner and outer dies have entrance passages 35 and 37 extending down from the top. The splitting means directs one stream of plastic into the entrance passages 35 of the inner die and the other into the entrance passages 37 of the outer die. As shown in FIG. 2, it splits the flared lowered end of annular space 19 into an inner annular entrance channel 39 opening into the upper ends of the entrance passages 35 of the inner die and an outer annular entrance channel 41 opening into the upper ends of the entrance passages 37 of the outer die.

As best shown in FIG. 2, inner die 23 comprises a circular upper member 43 secured, as by bolts 44, to the lower end of shaft 3 (i.e., it is bolted to the bottom end of tapered head 15) and is of larger diameter than head 15 of the shaft and extends radially outwardly therefrom. This upper member has a peripheral rim 45 projecting upwardly and downwardly, and a circular lower member 49 secured, as with bolts 51, to the bottom end thereof. Member 49 has on its surface a frustoconical surface 53 (see FIG. 4) flaring outwardly in downward direction. As shown in FIG. 4, extrusion orifices 27 of the inner die are formed by slots in the inner die frustoconical surface 53. For example, these extrusion slots or orifices are shown to be inclined or angled at about 30° to the die axis X—X (see FIG. 2) and are inclined relative to generatrices of conical surface 53 at an angle of about 45°. However, it will be understood that these angles could vary considerably from the above-stated values.

As shown in FIG. 2, the inner die rim 45 has a lower beveled edge 55 sealingly engaging the inner die frustoconical surface 53 and closing inner die slots or orifices 27. An inner die manifold 56 is further constituted by an annular space between the inner die rim 45 and the lower member 49 above the inner die rim beveled edge 55, this annular space being in communication with the upper ends of slots 27. Entrance passages 35 are arranged in member 43 as a circular series of equally spaced holes around its margin adjacent its rim 47, these entrance passages providing communication between the inner die manifold 56 and annular space 19.

Outer die 25 comprises a circular upper ring 57 secured to barrel 7 by means of bolts 59. Ring 57 is of larger diameter than inner die 23 and extends below barrel 7 and has an inner peripheral rim 61 extending downwardly and upwardly therefrom. Outer die 25 further includes a lower ring member 63 secured, as by bolts 65, on the bottom face of ring 57. Ring 63 has a generally frustoconical inner periphery 67 flaring outwardly in upward direction. The outer die extrusion orifices 29 are formed by slots in the outer die frustoconical periphery (see FIG. 5). For example, these extrusion slots or orifices are shown to be inclined or angled at about 30° to the die axis X—X and are inclined relative to generatrices of conical surface 67 at an angle of about 45°.

The extrusion orifices or passages 27 of the inner die 23 have inner (upper) ends at the inside (top) of the inner die spaced at intervals around a first circle C1 (see FIG. 3) lying generally in a plane perpendicular to the die axis X—X and having its center in the die axis, and have outer (lower) ends at the outside (bottom) of the inner die spaced at intervals around a second circle C2 (see FIG. 3) lying generally in a plane perpendicular to the die axis. The second circle C2 is larger than the first circle C1 and these circles thereby define a frustum of a first cone diverging in the direction (downward) toward the outside (bottom) of the die. The surface 53 is the surface of this first cone. The extrusion orifices or passages 29 of the outer die 25 have inner (upper) ends at the inside (top) of the other die spaced at intervals around a third circle C3 (see FIG. 4) lying generally in a plane perpendicular to the die axis X—X and having its center in the die axis, and have outer (lower) ends at the outside (bottom) of the outer die spaced at intervals around a second circle C4 (see FIG. 4) lying generally in a plane perpendicular to the die axis. The fourth circle C4 is smaller than the third circle C3 and these circles thereby define a frustum of a second cone converging in the direction (downward) toward the outside (bottom) of the die. The surface 67 is the surface of this second cone.

Outer die rim 61 has a lower beveled edge 69 engaging the outer die frustoconical periphery 67 in rotary sealing engagement and thus closes the outer die extrusion slots. An outer die manifold 70 is formed by an annular space between outer die rim 61 and lower ring 63 above beveled edge 69 in communication with the upper ends of the slots. Entrance passages 37 are arranged in ring 57 as a circular series of equally speced holes around its margin adjacent rim 61, these entrance passages providing communication between the outer die manifold 70 and annular space 19.

Rims 45 and 61 are in rotary sealing engagement with one another and their upper ends are beveled, as indicated at 71. A sprocket 72 is affixed to the upper end of shaft 3 for rotating the shaft and the inner die. As shown in FIG. 1, upper ring 57 includes a sprocket 73 around which a chain may be trained for rotating the outer die and barrel 7 in the direction opposite to the rotation of inner die 23.

Housing 1 comprises an upper section 77 having an outwardly extending flange 79 at its lower end with a downwardly extending annular rim 81 on this flange, and a cylindrical lower section 83 secured, as indicated at 85, to the rim and extending downwardly therefrom. Bearings 9 for barrel 7 are mounted in section 83, with a retainer 87 at the lower end of the section. After being extruded, netting N surrounds a mandrel 89 and is cooled in a water bath 91 (see FIG. 1).

Figure 10:
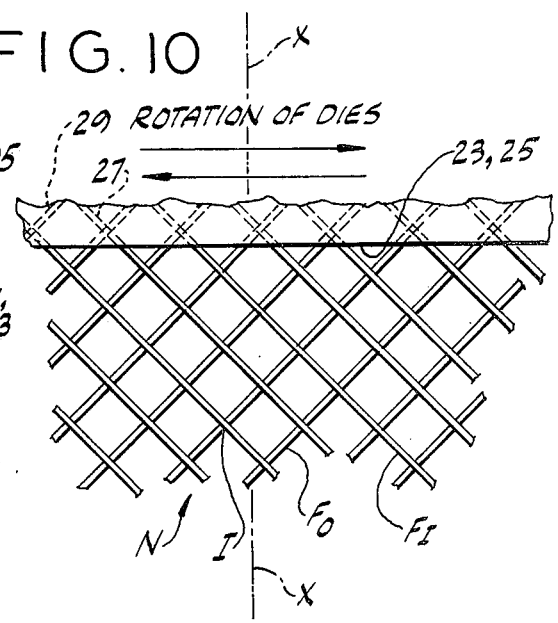
FIG. 10 is a semidiagrammatic representation of netting extruded by apparatus of this invention.
Figure 7:
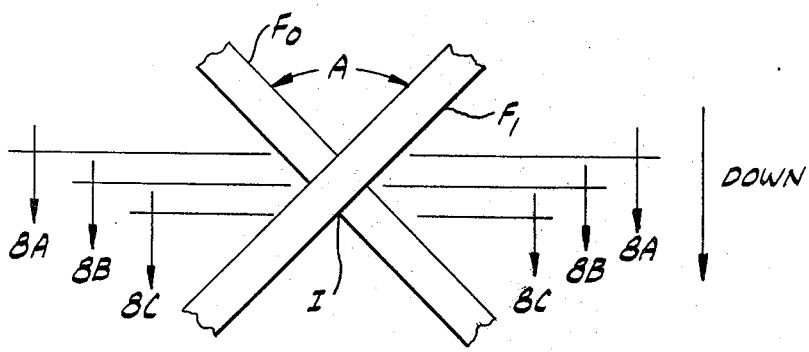
FIG. 7 is an enlarged view showing the intersection of two filaments of the tubular netting.
Figure 8A:
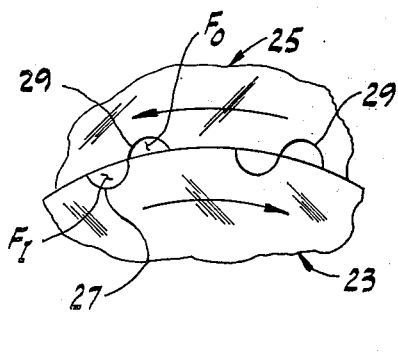
FIGS. 8A – 8C are views showing relative rotary positions of the inner and outer die orifices corresponding to formation of netting at lines 8A—8A, 8B—8B and 8C—8C of FIG. 7.
Figure 8B:
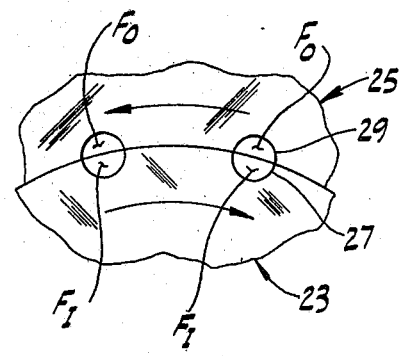
Figure 8C:
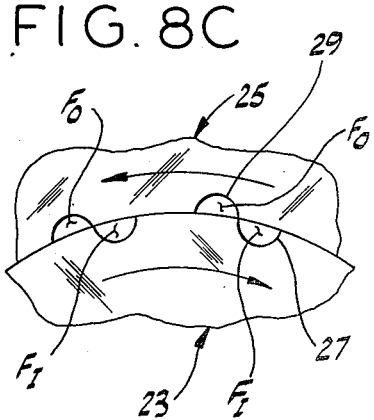

FIG. 7 is a diagrammatic representation of two intersecting netting filaments $F_I$ and $F_0$ extruded by apparatus of this invention and forming an intersection I. FIGS. 8A – 8C are enlarged bottom views of a portion of dies 23 and 25. FIGS. 8A and 8C illustrate out-of-register conditions of the lower ends of extrusion orifices 27 and 29 of the inner and outer dies 23 and 25. A single filament $F_I$ is extruded from each of the inner die orifices 27, and a single filament $F_0$ is extruded from each of the outer die orifices 29. As shown in FIG. 10, the filaments $F_I$ extruded by the inner die form a first series of filaments in which each filament $F_I$ is substantially parallel to the other filaments $F_I$ in the series, this first series of filaments being inclined at a first helical angle of approximately 45° with respect to the die axis X—X. The outer die 25 extrudes a second series of filaments $F_0$ with each of these filaments being equally spaced from one another and parallel to one another and inclined at a second helical angle of about 45° with respect to the die axis X—X, opposite to the direction of the helix angle of the first set of filaments $F_I$. As dies 23 and 25 counterrotate, netting N having intersections I between filaments $F_I$ and $F_0$ is generated, the intersections being formed when the extrusion orifices 27 and 29 are in register at their lower ends.

Figure 9:
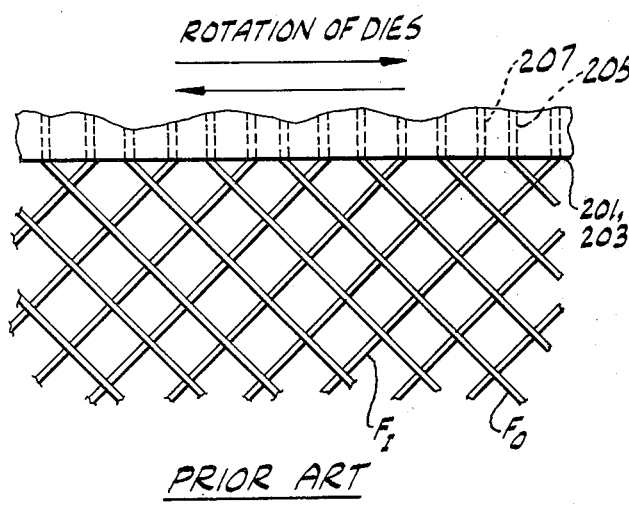
FIG. 9 is a semidiagrammatic representation of netting extruded by prior art extruding apparatus.

As shown in FIG. 9, filaments extruded from conventional extrusion inner and outer dies 201 and 203, respectively, each having straight or unbiased orifices 205 and 207 (i.e., orifices parallel to the die axis) exit their respective orifices parallel to the die axis and are immediately bent (approximately 45°) to assume an inclined position corresponding to the desired netting geometry. This bending of the filaments causes shear in the filaments and at their intersections which in turn may substantially weaken the netting. These weakened intersections may separate or delaminate during subsequent heating and stretching operations for orienting the molecular structure of the plastic netting and this delamination may render the netting unsuitable for commercial use.

As shown in FIG. 10, filaments $F_I$ and $F_0$ of netting N extruded by apparatus of the present invention are inclined with respect to the netting axis X—X at substantially the angle the filaments will occupy in netting N after the filaments have been cooled. Thus, the extrusion orifices 27 and 29 establish the direction of the netting filaments and intersections I are formed at substantially the angle at which the filaments are extruded from the dies. Because of this, the filaments need not move relative to one another or relative to the dies as the netting cools, and thus little or no shear is introduced into the individual filaments or into the intersections this insures that the strength of the intersections prior to the orientation of the netting is maximized.

Also, upon extrusion of filaments from conventional unbiased extrusion orifices, bending of the filaments causes movement thereof which may cause adjacent filaments to overlap with one another where not desired. Because the filaments are at least still partially molten, this overlapping may cause inadvertent bonding of the filaments and may prevent the formation of netting having a uniform mesh size and shape. With the biased extrusion orifices 27 and 29 of the present invention, the filaments $F_I$ and $F_0$ extruded therefrom need not be bent to conform to the desired netting geometry. Thus, with the apparatus and methods of this invention, the tendency of adjacent filaments to overlap is substantially reduced, which results in improved quality of the netting.

In accordance with this invention, the plastic netting N is extruded with an included angle A (see FIG. 7) between intersecting filaments $F_I$ and $F_0$ of about 70° – ° and preferably 90° or greater. An included angle such as above specified is particularly advantageous in subsequent heating and stretching operations for orienting the molecular structure of the netting. By providing such an included angle between intersecting filaments, axial stretching of the netting causes bending of each of the filaments adjacent intersections I, thus insuring that the individual filaments, rather than the intersection I per se, undergo axial elongation during the stretching operation. By substantially preventing stretching of intersections I during the stretching operation, the strength of the bond between the filaments at the intersections is enhanced and the tendency of the filaments to separate or delaminate at the intersections is substantially reduced.

Figure 5:
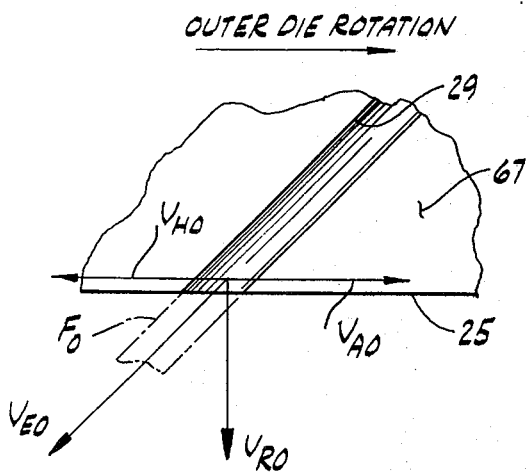
FIG. 5 is a semidiagrammatic view showing an extrusion orifice in the outer die illustrating the resultant velocity of a plastic filament extruded from an outer die extrusion orifice as the outer die rotates.

Referring now to FIG. 5, a portion of outer die 25 is depicted as having one extrusion orifice 29 angled therein with respect to a generatrix of surface 67 at an angle of about 45° away from the horizontal plane of the bottom of the dies. Of course, it will be understood that the included angle A between the intersecting filaments $F_I$ and $F_0$ may be varied by varying the angle of orifices 27 and 29 with respect to the generatrices of their respective conical die surfaces 53 and 67, respectively. The outer die is rotated, as indicated by the arrow in FIG. 5, at a constant angular velocity represented by the generally horizontal tangential velocity vector $V_{AO}$. Plastic filament $F_0$ extruded from the trailing end of orifice 29 exits coaxially with the orifice at a velocity relative to the outer die as represented by the velocity vector $V_{EO}$. It will be understood that the direction of vector $V_{EO}$ depends on the angle of inclination of orifice 29 relative to the generatrix of the surface 67 and the conical angle of surface 67, and its magnitude depends on the extruding pressure within the annular space 19, the viscosity of the plastic melt, and other factors. Preferably, the plastic is extruded from orifice 29 in such manner that the horizontal tangential component $V_{HO}$ of vector $V_{EO}$ is substantially equal (but opposite in direction to) the angular horizontal tangential velocity $V_{AO}$ of the outer die so that the resultant downward velocity of the filaments relative to a stationary reference is generally downward and indicated as to direction and magnitude by vector $V_{RO}$. Also, preferably the filaments are extruded from the biased extrusion orifices at an angle corresponding to the desired netting geometry.

Figure 6:
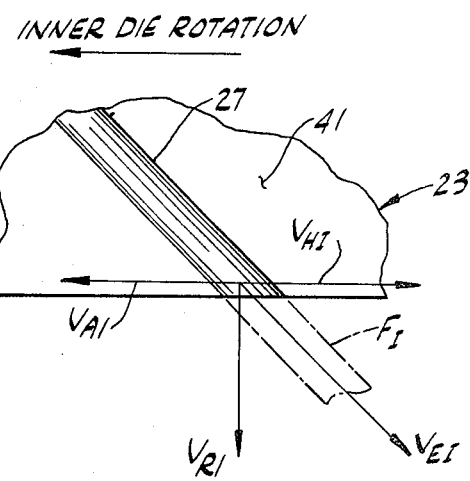
FIG. 6 is a semidiagrammatic view of a portion of the inner die similar to FIG. 5 illustrating the resultant velocity of a filament extruded from an inner die orifice as the inner die rotates.

Similarly, FIG. 6 shows a portion of inner die 23 having an extrusion orifice 27 angled with respect to a generatrix of surface 53 at an angle about 45° away from the horizontal plane of the bottom of the dies, the inner die rotating in the opposite direction from outer die 25. The angular horizontal tangential velocity of the inner die is depcited by velocity vector $V_{AI}$. Filament $F_I$ extruded from orifice 27 exits in the direction as indicated by a velocity vector $V_{EI}$ and has a generally downwardly velocity component $V_{RI}$ and a generally horizontal tangential component $V_{HI}$ egual (but opposite in direction) to the horizontal tangential angular velocity $V_{AI}$ of the inner die. As previously mentioned, the inner die counterrotates relative to the outer die at substantially the same angular velocity, and the rate of flow of plastic to the extrusion orifices 27 and 29 is substantially uniform, plastic being extruded from the orifices at substantially the same speed.

As previously mentioned, filaments $F_I$ and $F_O$ extruded from the inner and outer dies 23 and 25, respectively, meet on a generally cylindrical surface indicated at 31 in FIG. 2. Due to the conical surfaces 53 and 67 of inner and outer dies 23 and 25, respectively, filaments $F_I$ extruded from the inner die have a velocity component diverging generally outwardly in downward direction relative to die axis X—X, and the filaments $F_O$ extruded from orifices 29 in the outer die have a generally inward component in downward direction converging toward axis X—X. These oppositely directed velocity components of filaments $F_I$ and $F_O$ are advantageous in forming intersections I. More particularly, when orifices 27 and 29 of the inner and outer dies 23 and 25, respectively, are in register with one another at their lower ends, the still-molten plastic filaments extruded from the orifices of the inner and outer dies are caused to impinge together to enhance the formation of an intersection I. Since these converging and diverging directions of the filaments are opposite one another and since the filaments extruded from the orifices have substantially the same extrusion velocity, these converging and diverging velocity components cancel out, thus causing the netting formed thereby to move generally in downward direction as represented by the velocity vector $V_{RO}$ and $V_{RI}$ in FIGS. 5 and 6.

Since the filaments $F_I$ and $F_O$ move downwardly relative to dies 23 and 25, respectively, at substantially the same speed (as indicated by vectors $V_{RI}$ and $V_{RO}$ in FIGS 5 and 6), and since the filaments are extruded at substantially the desired netting geometry and thus need not be bent while still molten to conform to the netting geometry, there is substantially no relative shear movement between the filaments upon forming intersections I. Thus, intersections I have substantially greater strength and are better able to withstand subsequent stretching operations without delamination of the filaments at the intersections.

The operation of extruding tubular plastic netting N involves extruding a first generally circular series of filaments $F_O$ with each of the filaments of this first series inclined in one direction with respect to a plane (not shown) including the longitudinal axis of the netting (i.e., axis X—X). The operation further involves extruding a second generally circular series of filaments $F_O$ concentric with the first series with each of these second series of filaments inclined in the opposite direction of the first series of filaments with respect to the above-mentioned plane including the longitudinal axis of the netting. The first and second series are rotated in opposite directions at respective angular velocities such that the resultant horizontal tangential velocity of the filaments upon extrusion relative to a stationary point is approximately zero. Each of the first and second series $F_I$ and $F_O$, respectively, is rotated in such direction that the filaments trail in respect to the direction of their rotation. More particularly, the filaments $F_I$ are extruded on a first conical surface 53 and the second series of filaments $F_O$ are extruded on an oppositely angled conical surface 67, the conical surfaces being convergent toward one another (see FIG. 2).

In view of the above, it will be seen that the several objects of the invention are achieved and other advantageous results attained.

As various changes could be made in the above constructions and without departing from the scope of the invention, it is intended that all matter contained in the above description or shown in the accompanying drawings shall be interpreted as illustrative and not in a limiting sense.

What is claimed is:

1. Apparatus for extruding plastic netting comprised concentric inner and outer dies, the outer die having a central opening and the inner die having a rotary sealing fit in said opening, the inner die being rotatable in one direction and the outer die being rotatable in the opposite direction about a common die axis, each die having a circular series of extrusion passages for extrusion of filaments of plastic therethrough from one side of the die constituting its inside to the other side constituting its outside, the extrusion passages of the inner die having inner ends at said inside of the inner die spaced at intervals around a first circle lying generally in a plane perpendicular to said axis and having its center in said die axis, and having outer ends at said outside of the inner die spaced at intervals around a second circle lying generally in a plane perpendicular to said axis and having its center in said die axis, said second circle being larger than said first circle and said circles thereby defining a frustum of a first cone diverging in the direction toward the outside of the inner die, the extrusion passages of the outer die having inner ends at said inside of the inner die spaced at intervals around a third circle lying generally in a plane perpendicular to said axis and having its center in said die axis, and having outer ends at said outside of the inner die spaced at intervals around a fourth circle lying generally in a plane perpendicular to said axis and having its center in said die axis, said fourth circle being smaller than said third circle and said third and fourth circles thereby defining a frustum of a second cone converging in the direction toward the outside of the outer die, the extrusion passages of the inner die extending from said first circle to said second circle and thereby being angled outwardly away from said die axis, and also being inclined in one direction relative to the generatrices of said first cone and the extrusion passages of the outer die extending from said third circle to said fourth circle and thereby being angled inwardly toward said die axis, and also being inclined in the opposite direction relative to the generatrices of said second cone.

2. Apparatus as set forth in claim 1 wherein one end of each passage in each die leads and the other trails as the die rotates, the leading ends of the extrusion passages being their inner ends and the trailing ends of the passages being their outer ends.

3. Apparatus as set forth in claim 1 wherein the extrusion passages of the inner and outer dies are oppositely inclined relative to a plane perpendicular to said die axis at angles such that said filaments intersect at an angle between 70° and 110°.

4. Apparatus as set forth in claim 1 wherein the extrusion passages are angled at about 30° to the die axis and are inclined at about 45° to a plane perpendicular to said die axis.

5. Apparatus as set forth in claim 1 wherein the inner die comprises an inner member and an outer member having conical surfaces in sealing engagement, said surfaces defining said first cone, one of said surfaces having slots therein forming the extrusion passages of the inner die, and wherein the outer die comprises an inner member and an outer member having conical surfaces in sealing engagement and defining said second cone, one of the latter surfaces having slots therein forming the extrusion passages of the outer die..

6. Apparatus as set forth in claim 1 wherein said extrusion passages in said inner and outer dies are inclined with respect to their respective generatrices in such direction that the filaments extruded from both the inner and outer dies move generally downwardly at substantially the same velocity so as to substantially eliminate shear movement between the filaments extruded by the inner and outer dies upon the formation of intersections of the filaments, and wherein said extrusion passages are so angled with respect to said die axis as to cause said filaments to impinge together to enhance formation of intersections between the filaments.

7. Apparatus as set forth in claim 6 wherein said extrusion passages of said inner and outer dies are so inclined that each said filament extruded therefrom has a generally vertically downward velocity component and a generally horizontal velocity component relative to its respective die, said horizontal component being generally equal but opposite in direction to the angular velocity of its respective die whereby netting of uniform mesh size is extruded from the extrusion passages in the inner and outer dies and moves generally downwardly from said dies.

8. Apparatus as set forth in claim 6 wherein said extrusion passages of said inner and outer dies are inclined relative to the generatrices of their respective conical surfaces such that the filaments extruded therefrom intersect at an angle of about 90°.

* * * * *